United States Patent
Nichols et al.

(10) Patent No.: US 9,219,592 B1
(45) Date of Patent: Dec. 22, 2015

(54) GROWTH METRIC PREDICTED LOADING ON WIRELESS ACCESS NODES

(71) Applicant: Sprint Communications Company L.P., Overland Park, KS (US)

(72) Inventors: Cheryl Marie Nichols, Raymore, MO (US); Seng Chai Gan, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 238 days.

(21) Appl. No.: 14/059,778

(22) Filed: Oct. 22, 2013

(51) Int. Cl.
- *H04J 3/00* (2006.01)
- *H04L 5/00* (2006.01)
- *H04W 72/04* (2009.01)

(52) U.S. Cl.
CPC .............. *H04L 5/0058* (2013.01); *H04W 72/04* (2013.01)

(58) Field of Classification Search
CPC .................................................... H04W 72/04
USPC .......................... 370/280–311; 709/203–227
See application file for complete search history.

(56) References Cited

U.S. PATENT DOCUMENTS

| 8,340,680 | B2 | 12/2012 | Puthenpura et al. | |
|---|---|---|---|---|
| 8,924,503 | B2 * | 12/2014 | Brech | 709/216 |
| 2012/0134294 | A1 | 5/2012 | Puthenpura et al. | |
| 2012/0303413 | A1 | 11/2012 | Wang et al. | |
| 2014/0192685 | A1 * | 7/2014 | Mueck et al. | 370/280 |

* cited by examiner

Primary Examiner — Iqbal Zaidi

(57) ABSTRACT

Systems, methods, and software for operating a wireless communication system to predict loading on a wireless access node are provided herein. In one example, a method includes allocating past wireless communication usage in a geographic area served by the wireless access node among different wireless communication device types, identifying a growth metric for each of the wireless communication device types based on past device sales in a geographic region larger than the geographic area, and applying the growth metric for each of the wireless communication device types to the past communication usage allocated to each of the wireless communication device types to predict future communication usage for each of the wireless communication device types at the wireless access node. The method also includes aggregating the predicted future communication usage loading for each of the wireless communication device types to predict the future loading on the wireless access node.

18 Claims, 4 Drawing Sheets

GROWTH METRIC PREDICTED LOADING ON WIRELESS ACCESS NODES

TECHNICAL FIELD

Aspects of the disclosure are related to the field of communications, and in particular, operations of wireless communication devices and wireless access nodes in wireless communication networks.

TECHNICAL BACKGROUND

Wireless communication systems, such as cellular voice and data networks, typically include multiple wireless access nodes spread over a geographic area through which wireless communication devices can register and receive wireless access to communication services. In many examples, the wireless communication devices are mobile, and can move between wireless coverage areas of the wireless access nodes.

A wireless services provider, such as an operator of a cellular voice and data network, can provide wireless communication services over varied geographic areas, such as cities, metro areas, states, countries, as well as globally. These wireless services providers typically desire to estimate network activity based activities of wireless communication devices. These estimates are typically used for resource planning, equipment upgrades, backhaul scheduling, among others. However, it can be difficult and imprecise to estimate wireless resource changes for each individual wireless access node in a cellular voice and data network.

OVERVIEW

Systems, methods, and software for operating a wireless communication system to predict loading on a wireless access node are provided herein. In one example, method of operating a wireless communication system to predict loading on a wireless access node is provided. The method includes allocating past wireless communication usage in a geographic area served by the wireless access node among a plurality of different wireless communication device types. The method also includes identifying a growth metric for each of the wireless communication device types based on past device sales in a geographic region larger than the geographic area. The method also includes applying the growth metric for each of the wireless communication device types to the past communication usage allocated to each of the wireless communication device types to predict future communication usage for each of the wireless communication device types at the wireless access node. The method also includes aggregating the predicted future communication usage loading for each of the wireless communication device types to predict the future loading on the wireless access node.

In another example, a software apparatus is provided to operate a wireless communication system to predict loading on a wireless access node. The software apparatus includes software configured to direct a processing system to allocate past wireless communication usage in a geographic area served by the wireless access node among a plurality of different wireless communication device types, identify a growth metric for each of the wireless communication device types based on past device sales in a geographic region larger than the geographic area, apply the growth metric for each of the wireless communication device types to the past communication usage allocated to each of the wireless communication device types to predict future communication usage for each of the wireless communication device types at the wireless access node, aggregate the predicted future communication usage loading for each of the wireless communication device types to predict the future loading on the wireless access node. The software apparatus also includes one or more storage media that stores the software.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
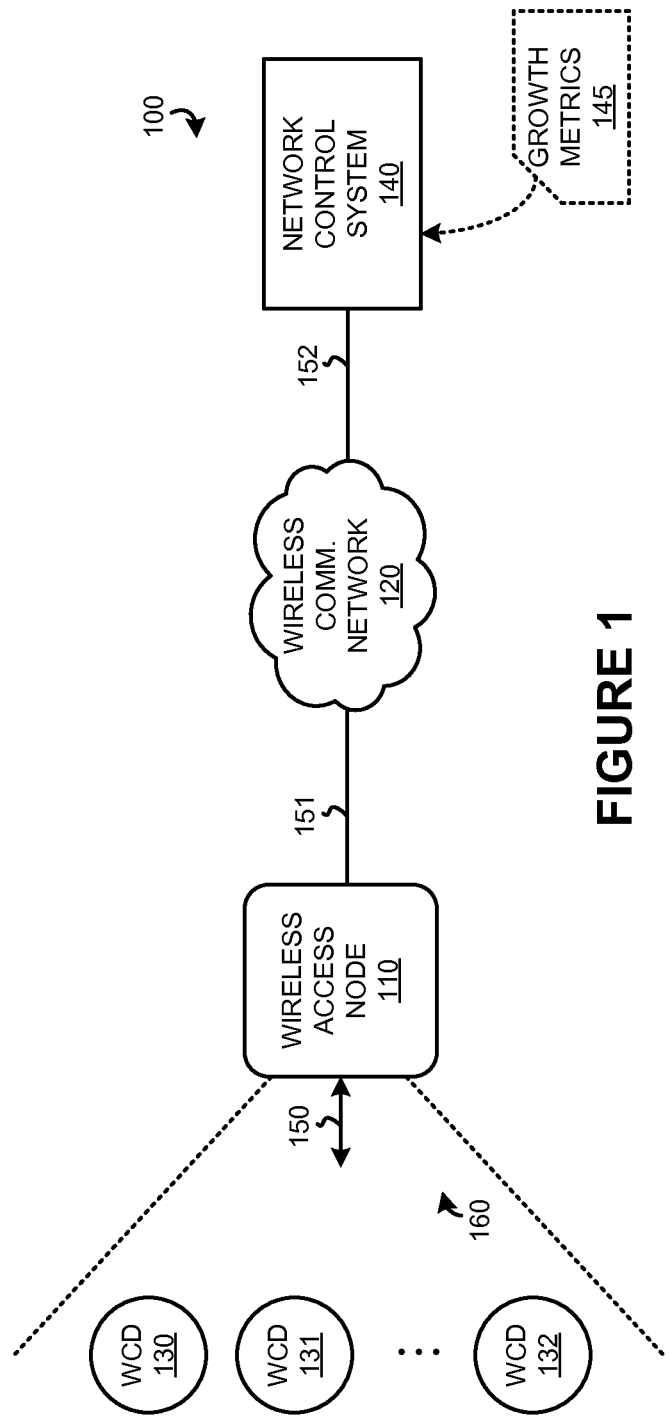
FIG. 1 is a system diagram illustrating a communication system.

FIG. 1 is a system diagram illustrating communication system 100. Communication system 100 includes wireless access node 110, wireless communication network 120, wireless communication devices (WCD) 130-132, and network control system 140. Wireless access node 110 provides wireless access to communication services for wireless access devices 130-132 over wireless link 150. Although one wireless link 150 is shown in FIG. 1 for clarity, it should be understood that separate links can be instead included. Wireless access node 110 and wireless communication network 120 communicate over link 151. Wireless communication network 120 and network control system 140 communicate over link 152.

In operation, ones of wireless communication devices 130-132 can receive wireless access to communication services of wireless communication network 120 through wireless access node 110. Wireless communication network 120 can include many wireless access nodes to provide continuous wireless access over a geographic region, such as a city, ZIP code area, state, country, or globally. In typical examples, wireless communication devices 130-132 are mobile devices, and are free to move between various wireless coverage areas of various wireless access nodes. Coverage area 160 is shown as a geographic area for wireless coverage associated with wireless access node 110 in this example. Network control system 140 can control various aspects of wireless communication system 120 and wireless access node 110, among other communication elements and systems not shown in FIG. 1 for clarity.

Figure 2:
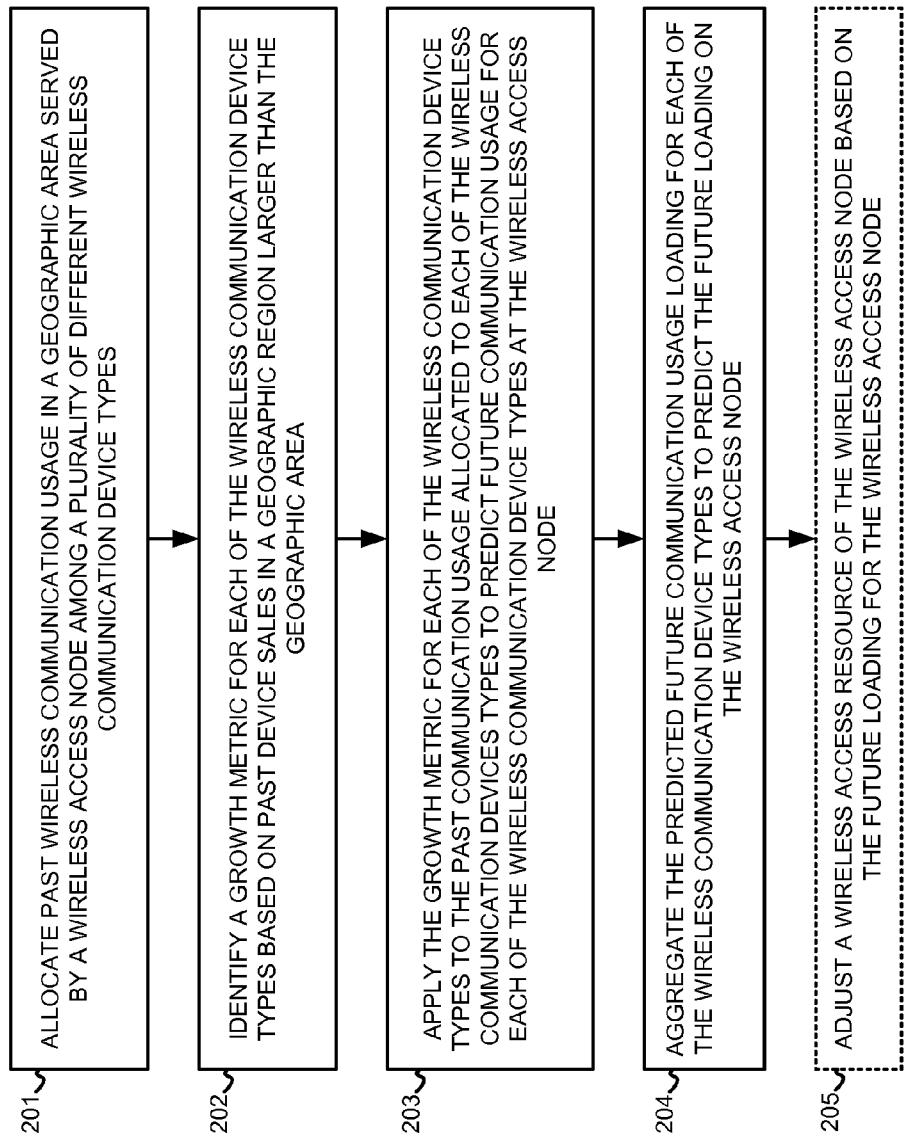
FIG. 2 is a flow diagram illustrating a method of operation of a network control system.

To illustrate an example operation of the elements of communication system 100, FIG. 2 is provided. FIG. 2 is a flow diagram illustrating a method of operating network control system 140. The operations of FIG. 2 are referenced below parenthetically. In FIG. 2, network control system 140 allocates (201) past wireless communication usage in a geographic area served by a wireless access node among a plurality of different wireless communication device types. As wireless communication devices, such as those shown in FIG.

1, enter and exit the coverage area of wireless access node 110, these wireless communication devices can receive wireless access through wireless access node 110 after a registration process or handoff process from another wireless access node. Information regarding these wireless communication devices and past activities thereof can be identified by wireless access node 110 or other elements of wireless communication system 120, such as authentication, authorization and accounting (AAA) equipment. The information can be provided to network access system 140.

The information can include information related to communication session types, such as voice calls, text messaging, data transfers, and the like, which can be used to identify what activity a wireless communication device was engaging in via wireless access node 110. The information can include information related to the wireless communication devices themselves, such as device identifiers, device types, device model numbers or model names, device manufacture identifiers, and the like, which can be used to separate wireless communication devices of different types into groups of similar wireless communication devices. The information can also include information on communication session durations, such as a duration of a voice call, duration of a data session, or other related information such as time of day of the communication sessions. Additionally, network control system 140 can identify a geographic location of wireless access node 110, which can include maintaining a database of geographic locations of many wireless access nodes associated with wireless communication network 120.

Network control system 140 can process portions of the information listed above to allocate the past wireless communication usage in the geographic area served by wireless access node 110 among a plurality of different wireless communication device types. As mentioned above, the plurality of wireless communication device types can include the device model number, device model type, device model name, device manufacturer, among other types. Network control system 140 can establish groups of similar wireless communication device types and allocate the past wireless communication usage for wireless access node 110 among the various groups of similar wireless communication device types. For example, one group might be smartphones and another group might be feature phones. In another example, one group might be Apple iPhone devices, while another group might be Android compatible devices. Further groups can be established, include sub-groups that divide each main group based on model number, screen size, device brand, and the like.

Network control system 140 allocates the past wireless communication usage based on various factors. These factors can include data usage in bits, voice call usage in duration, such as minutes, and text message usage in quantity of messages. Other categories of usage can be identified and have past wireless communication usage allocated accordingly. Network control system 140 thus can determine allocation data indicating amounts of the types of past wireless communication usage allocated among the various wireless communication device types.

Network control system 140 identifies (202) a growth metric for each of the wireless communication device types based on past device sales in a geographic region larger than the geographic area. In this example, the geographic region encompasses a larger geographic area than the geographic area associated with wireless coverage of wireless access node 110, but typically the geographic area associated with wireless access node 110 is located within the geographic region. For example, the geographic region can include the area defined by a ZIP code, metro area, county, state, region including more than one state, country, continent, or globally, among other regions, including combinations and variations thereof.

The growth metric can include information related to changes in device sales, such as increases or decreases in unit sales for a given geographic region over a period of time. The past device sales can include past sales data allocated among different device types, such as those allocated among in operation 201. For example, the past sales data can include a percentage change in device sales for devices of each type that area sold, operated, or homed in the geographic region. Multiple geographic regions can be included in the past sales data, and device sales apportioned among the various geographic regions and various wireless communication device types. The past device sales can be received from external systems over link 152 into network control system 140, and included in a data structure, such as a database.

Network control system 140 applies (203) the growth metric for each of the wireless communication device types to the past communication usage allocated to each of the wireless communication devices types to predict future communication usage for each of the wireless communication device types at the wireless access node. The past communication usage indicates the mixture of wireless access activity at wireless access node 110, as allocated among each wireless communication device type. The growth metric indicates a change in wireless communication device quantities for the associated geographic region, such as an increase or decrease in sales of the various wireless communication device types. The growth metric for each wireless communication device type is applied to the past communication usage for each wireless communication device type, and a predicted change in communication usage for each wireless communication device type can be determined. The predicted change can include an increase or a decrease in communication usage for each wireless communication device type. For example, when a particular wireless communication device type has an increase in growth indicated in the growth metric, then a predicted communication usage can be identified which increases communication usage for that wireless communication device type. The predicted or projected communication usage for wireless access node 110 comprises scaling the past communication usage for each wireless communication device type based on the growth metric for each wireless communication device type.

Network control system 140 aggregates (204) the predicted future communication usage loading for each of the wireless communication device types to predict the future loading on the wireless access node. The future loading can comprise changes in loading on wireless access resources of wireless access node 110 which are used by wireless communication devices. The wireless access resources can include traffic channels, overhead communication channels, resource blocks, frequency allocations, as well as predicted changes in voice calls, data sessions, data quantities, text message traffic, and the like. Once the growth metrics and the past communication usages are applied to each wireless communication device type to determine the predicted future communication usage loading, then network control system 140 can aggregate the predicted future communication usage loading for each of the wireless communication device types into a predicted loading for wireless access node 110. The predicted loading on wireless access node 110 can reflect all changes in predicted future communication usage across all wireless communication device types. The changes can indicate changes in communication usage mixtures among the various wireless communication device types, as well as aggregate changes in communication usage for the entire communication traffic or usage predicted for wireless access node 110.

Optionally, network control system 140 can instruct wireless access node 110 or elements of wireless communication system 120 to adjust (205) a wireless access resource of the wireless access node based on the future loading for the wireless access node. The future loading can indicate changes in wireless access resources for wireless access node 110. Based on these changes, network control system 140 can instruct or indicate to wireless access node 110 or other elements of wireless communication system 120 to adjust various resources. These resources can include backhaul link provisioning to accommodate changes in backhaul traffic at wireless access node 110 due to predicted increases or decreases in wireless communication usage. For example, if a predicted future loading of wireless access node 110 is established as increasing, then backhaul link resources can be increased accordingly by scheduling more bandwidth over an associate backhaul link, or changing a mixture of backhaul resources available for voice calls, data, text messages, multimedia, and the like. Likewise, wireless resources of wireless access node 110 can be adjusted according to a change in mixture or amount of communication session types and wireless communication device types do allocate wireless access resources differently among the various device and communication types. The wireless access resources can include logical resources such as resource blocks, frequency assignments, channel assignments, and the like, and can also include RF resources, such as antenna configurations, amplifier power settings, multiple input multiple output (MIMO) configurations, or other wireless resources associated with wireless access node 110. In some examples, if the bulk or aggregate change in communication usage for wireless access node 110 indicates a large increase in communication usage, then further wireless access, backhaul, or routing equipment can be installed to aid wireless access node 110.

Figure 3:
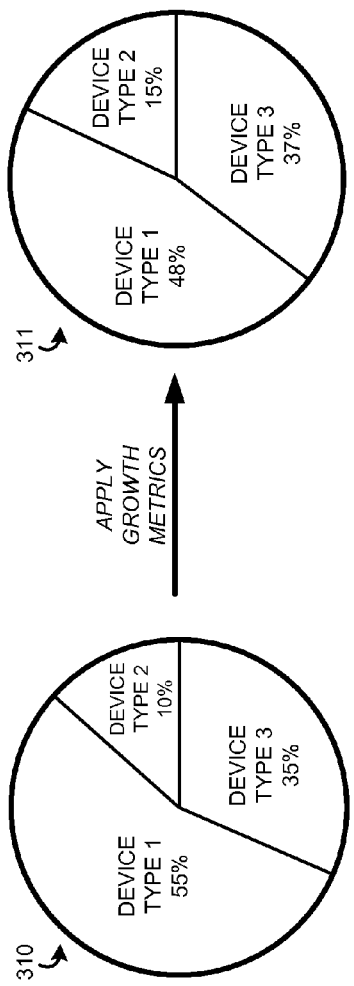
FIG. 3 is a chart diagram illustrating device types.
Figure 4:
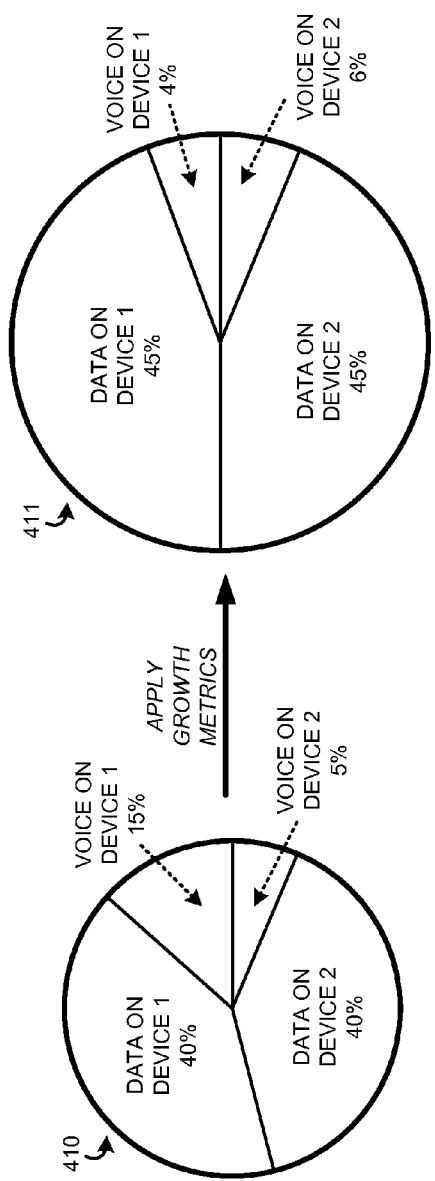
FIG. 4 is a chart diagram illustrating device usages.

As further examples of predicted communication usage changes for wireless access nodes, FIGS. 3 and 4 are presented. The discussion below for FIG. 3 and FIG. 4 can be applied to the elements of FIG. 1 or FIG. 5, such as wireless access node 110, network control system 140, or network control system 500, among others. FIG. 3 and FIG. 4 are each chart diagrams illustrating changes in device types and device usages according to growth metrics. The initial charts indicated in each of FIG. 3 and FIG. 4 can represent usage models of past communication usage of an associate wireless access node, where the usage models indicate the mixtures of usage of communication resources of the wireless access node allocated among different wireless communication device types.

In FIG. 3, a chart illustrating device types is presented. Past communication usage of a wireless access node is indicated in chart 310 in FIG. 3, with communication usage allocated among three different wireless communication device types, namely 55% allocated to device type 1, 10% allocated to device type 2, and 35% allocated to device type 3. The different device types can be any of the wireless communication device types discussed herein. For examples, device type 1 can indicate Apple iPhone devices, device type 2 can indicate Blackberry, and device type 3 can indicate Android compatible devices. It should be understood that different usage mixtures and device types can be included.

Growth metrics are identified and applied to chart 310 which results in chart 311 that indicates predicted future communication usage for the wireless access node. In this example, the total communication usage does not change for the wireless access node, but the mixture of the various wireless communication device types changes. Specifically, predicted allocation of communication usage for wireless communication device type 1 changes from 55% to 48%, predicted allocation of communication usage for wireless communication device type 2 changes from 10% to 15%, and predicted allocation of communication usage for wireless communication device type 3 changes from 35% to 37%. In this example, the growth metric might indicate that Android device sales have increased against other device types for a particular geographic region, such as the city associated with the wireless access node. This increase in Android device sales is allocated against the past communication usage of the wireless access node to establish the predicted communication usage for Android devices at the wireless access node. Based on the changes indicated in chart 311, the various wireless access resources or backhaul resources of the associated wireless access node can be adjusted accordingly.

In FIG. 4, a chart illustrating device usages is presented. Past communication usage of a wireless access node is indicated in chart 410 in FIG. 4, with communication usage of two types allocated among two different wireless communication device types, namely data usage by wireless communication device type 1 of 40%, voice call usage by wireless communication device type 1 of 15%, data usage by wireless communication device type 2 of 40%, and voice call usage by wireless communication device type 2 of 5%. The different device types can be any of the wireless communication device types discussed herein. For examples, device type 1 can indicate Apple iPhone devices and device type 2 can indicate Android compatible devices. It should be understood that different usage mixtures and device types can be included.

Growth metrics are identified and applied to chart 410 which results in chart 411 that indicates predicted future communication usage for a wireless access node. In this example, the total communication usage increases for the wireless access node, as indicated by the increase in 'size' of chart 411 from chart 410. Also, the mixture of the various wireless communication device types and usages changes. Specifically, predicted allocation of data usage for wireless communication device type 1 changes from 40% to 45%, predicted allocation of voice call usage for wireless communication device type 1 changes from 15% to 4%, predicted allocation of data usage for wireless communication device type 2 changes from 40% to 45%, and predicted allocation of voice call usage for wireless communication device type 2 changes from 5% to 6%. In this example, the growth metric might indicate that both iPhone and Android device sales have increased, but the ratio of quantities of the two wireless communication device types has remained the same. However, usage type allocations have changed based on the growth metrics. This change can be the result of more data usage predicted for iPhone devices compared to voice call usage predicted for iPhone devices. Again, the growth metric can be for geographic regions larger than the coverage area associated with a particular wireless access node represented in chart 410, such as the city or state associated with the wireless access node. This increase in all device sales is allocated against the past communication usage of the wireless access node as well as usage types (data, voice) to establish the predicted communication usage for both device types at the wireless access node. Based on the changes indicated in chart 411, the various wireless access resources or backhaul resources of the associated wireless access node can be adjusted accordingly.

The communication usages discussed herein can be representative of various types of communications, such as data communications, voice communications, text message communications, or other communications. To determine the communication usage amounts, communication session characteristics can be identified as comprising communication session types or communication session durations for communication sessions handled by a particular wireless access node. The communication session characteristics for a particular wireless access node can be processed by a network control system described herein to determine a usage model for that particular wireless access node. The usage model can identify a quantity of each of the communication session types per each the plurality of different wireless communication device types. In voice call examples, the usage model can identify a time of duration of each of the communication session types per each the plurality of different wireless communication device types. In data session examples, the usage model can identify a bit count of each of the communication session types per each the plurality of different wireless communication device types. In some examples, all communication session types are grouped to the associated wireless communication device type, while in other examples the communication session types are separately listed for each wireless communication device type.

In further examples, the usage model identified for a particular wireless access node can include time of day based usage factors. For example, a particular wireless access node might have a surge in voice call traffic during business hours, but very little voice call activity during non-business hours. This variability based on time of day can be processed along with the growth factors to determine if the change in communication usage affects a particular time of time more than a different time of day. Various wireless access resources of the affected wireless access node can be scheduled to align with the time of day variations of the usage model.

In yet further examples, when particular wireless communication device types are identified as being involved in communication usage at a particular wireless access node, the screen size or other user interface factors can be considered. In some wireless communication device types, a larger screen is employed than in other wireless communication device types. This larger screen size can scale the data usage for a particular wireless communication device type to a greater degree than data usage for a smaller-screen wireless communication device based on larger screen sizes generally having higher data usage through the viewing of multimedia content, web content, and the like. The screen size can scale a particular wireless communication device type among the other wireless communication device types to account for predicted communication usage. For example, a large-screen wireless communication device might see a larger per-device increase in data usage for a given growth metric than a small-screen wireless communication device.

Figure 5:
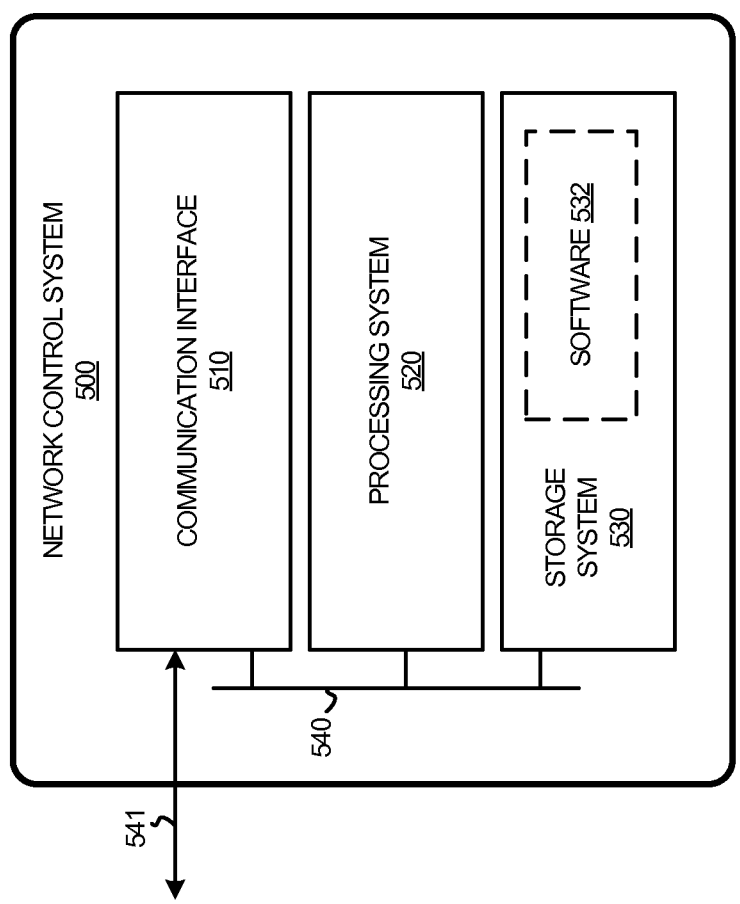
FIG. 5 is a block diagram illustrating a network control system.

FIG. 5 is a block diagram illustrating a detailed view of network control system 500. Network control system 500 can include equipment and systems as discussed herein for network control system 140 in FIG. 1, although variations are possible. Network control system 500 includes communication interface 510, processing system 520, and storage system 530. In operation, processing system 520 is operatively linked to communication interface 510 and storage system 530 by bus 540. It should be understood that discrete links can be employed, such as network links or other circuitry. Network control system 500 can be distributed or consolidated among equipment or circuitry that together forms the elements of network control system 500. Network control system 500 can optionally include additional devices, features, or functionality not discussed here for purposes of brevity.

Communication interface 510 includes a network interface for communicating over communication networks, such as wireless communication network 120 of FIG. 1. The network interface can include an Ethernet interface, or other local or wide area network communication interfaces which can communicate over a communication link. Examples of communication interface 510 include network interface card equipment, transceivers, modems, and other communication circuitry. In this example, communication interface 510 communicates over link 541. Link 541 can include any communication link as described herein, such as that described for link 152 in FIG. 1.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

Storage system 530 can comprise any computer readable storage media readable by processing system 520 and capable of storing software 532. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by network control system 500 in general or processing system 520 in particular, direct network control system 500 or processing system 520 to allocate past wireless communication usage in a geographic area served by a wireless access node among a plurality of different wireless communication device types, identify a growth metric for each of the wireless communication device types based on past device sales in a geographic region larger than the geographic area, apply the growth metric for each of the wireless communication device types to the past communication usage allocated to each of the wireless communication devices types to predict future communication usage for each of the wireless communication device types at the wireless access node, and aggregate the predicted future communication usage loading for each of the wireless communication device types to predict the future loading on the wireless access node, among other operations. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to allocate past wireless communication usage in a geographic area served by a wireless access node among a plurality of different wireless communication device types, identify a growth metric for each of the wireless communication device types based on past device sales in a geographic region larger than the geographic area, apply the growth metric for each of the wireless communication device types to the past communication usage allocated to each of the wireless communication devices types to predict future communication usage for each of the wireless communication device types at the wireless access node, and aggregate the predicted future communication usage loading for each of the wireless communication device types to predict the future loading on the wireless access node, among other operations.

In general, software 532 can, when loaded into processing system 520 and executed, transform processing system 520 overall from a general-purpose computing system into a special-purpose computing system customized to allocate past wireless communication usage in a geographic area served by a wireless access node among a plurality of different wireless communication device types, identify a growth metric for each of the wireless communication device types based on past device sales in a geographic region larger than the geographic area, apply the growth metric for each of the wireless communication device types to the past communication usage allocated to each of the wireless communication devices types to predict future communication usage for each of the wireless communication device types at the wireless access node, and aggregate the predicted future communication usage loading for each of the wireless communication device types to predict the future loading on the wireless access node, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Network control system 500 can also include other elements, such as user interfaces, computer systems, databases, distributed storage and processing elements, and the like. Network control system 500 can be included in the equipment or systems of first wireless communication network 120 or wireless access node 110 of FIG. 1 or can be included in separate equipment or systems, including combinations thereof.

Referring back to FIG. 1, wireless access node 110 is associated with communication network 120, and provides wireless links for wireless access to the communication services of communication network 120 within geographic area 160. Wireless access node 110 comprises RF communication and control circuitry, transceivers, and antennas, as well as wireless communications equipment capable of communicating with and providing wireless access within a wireless coverage area 160 to communication services for wireless communication devices, such as wireless communication devices 130-132. The RF communication circuitry typically includes amplifiers, filters, RF modulators, transceivers, and signal processing circuitry. Wireless access node 110 can also comprise elements such as base stations, base transceiver stations (BTS), E-UTRAN Node B equipment, eNodeB equipment, Evolved Node B equipment, Evolved Universal Terrestrial Radio Access (E-UTRA) network equipment.

Wireless communication devices (WCD) 130-132 each comprise a processing system, a plurality of transceiver portions, user interface elements, and other communication elements. The transceiver portions typically include amplifiers, filters, modulators, and signal processing circuitry. The transceiver portions can be used to communicate over at least link 150, which can include wired, optical, or wireless links. The processing system can include one or more processing portions. WCD 130-132 can also each include user interface systems, memory devices, non-transitory computer-readable storage mediums, software, processing circuitry, or some other communication components. WCD 130-132 can each be a sensor device, user device, subscriber equipment, customer equipment, access terminal, wireless smartphone, computer, mobile Internet appliance, wireless network interface card, media player, game console, or some other communication apparatus, including combinations thereof.

Wireless communication network 120 comprises communication and control systems for providing access to communication services for other devices and networks. Wireless communication network 120 can each provide communication services including communication routing, link bridging, network communications, data exchange, or other communication services. In some examples, wireless communication network 120 is a cellular voice and data network that can provide voice calls, text messages, data access, or other communication services provided over cellular or wireless communication networks. In some examples, wireless communication network 120 includes equipment to provide wireless access to communication services within different coverage areas to user devices, route communications between content providers and user devices, and facilitate handoffs between equipment of different coverage areas, among other operations. Wireless communication network 120 can also comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Network control system 140 comprises computer processing systems and equipment. Network control system 140 can include communication or network interfaces, as well as computer systems, microprocessors, circuitry, cloud-based systems, or some other processing devices or software systems, and can be distributed among multiple processing devices. Examples of network control system 140 can also include software such as an operating system, logs, databases, utilities, drivers, networking software, and other software stored on a computer-readable medium.

Communication links 151-152 each use metal, glass, optical, air, space, or some other material as the transport media. Communication links 151-152 can each use various communication protocols, such as Time Division Multiplex (TDM), asynchronous transfer mode (ATM), Internet Protocol (IP), Ethernet, synchronous optical networking (SONET), hybrid fiber-coax (HFC), Universal Serial Bus (USB), circuit-switched, communication signaling, wireless communications, or some other communication format, including combinations, improvements, or variations thereof. Communication links 151-152 can each be a direct link or can include intermediate networks, systems, or devices, and can include a logical network link transported over multiple physical links. Communication links 151-152 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Communication link 150 includes one or more wireless links, and use the air or space as the transport media. Communication link 150 comprises one or more wireless communication links provided over an associated wireless frequency spectrum or wireless frequency band, and can use various protocols. In this example, communication link 150 can comprise Long Term Evolution (LTE), LTE Advanced, Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main link for each of links 150-152 is shown in FIG. 1, it should be understood that links 150-152 are merely illustrative to show communication modes or access pathways. In other examples, further links can be shown, with portions of the further wireless links shared and used for different communication sessions or different content types, among other configurations.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system to predict loading on a wireless access node, the method comprising:

in a network control system, allocating past wireless communication usage in a geographic area served by the wireless access node among a plurality of different wireless communication device types by at least determining a usage model for the wireless access node, wherein the usage model identifies at least a quantity of communication session types per each of the plurality of different wireless communication device types;

in the network control system, identifying a growth metric for each of the wireless communication device types based on past device sales in a geographic region larger than the geographic area; and in the network control system, applying the growth metric for each of the wireless communication device types to the past communication usage allocated to each of the wireless communication device types to predict future communication usage for each of the wireless communication device types at the wireless access node;

in the network control system, aggregating the predicted future communication usage loading for each of the wireless communication device types to predict the future loading on the wireless access node; and adjusting a wireless access resource of the wireless access node based on the future loading for the wireless access node.

2. The method of claim 1, wherein the geographic area comprises a sector of the wireless access node and the geographic region comprises an area associated with a zip code.

3. The method of claim 1, wherein the geographic area comprises a sector of the wireless access node and the geographic region comprises a metro area.

4. The method of claim 1, wherein the geographic area comprises a sector of the wireless access node and the geographic region comprises a state.

5. The method of claim 1, wherein the geographic area comprises a sector of the wireless access node and the geographic region comprises a country.

6. The method of claim 1, wherein the geographic area comprises a sector of the wireless access node and the geographic region is global.

7. The method of claim 1, wherein allocating the past wireless communication usage in the geographic area served by the wireless access node among the plurality of different wireless communication device types comprises:

identifying communication session characteristics comprising the communication session types, communication session durations, and the plurality of different wireless communication device types for a plurality of communication sessions handled by the wireless access node; and processing at least the communication session characteristics to determine the usage model for the wireless access node.

8. The method of claim 1, wherein the growth metric comprises user device sales information indicating a change in sales quantity of at least one of the plurality of different wireless communication device types.

9. The method of claim 1, wherein the plurality of different wireless communication device types comprise at least one of wireless communication device models and wireless communication device manufacturers.

10. A software apparatus to operate a wireless communication system to predict loading on a wireless access node, comprising:
software configured to direct a processing system to:
allocate past wireless communication usage in a geographic area served by the wireless access node among a plurality of different wireless communication device types by at least determining a usage model for the wireless access node, wherein the usage model identifies at least a quantity of communication session types per each of the plurality of different wireless communication device types;
identify a growth metric for each of the wireless communication device types based on past device sales in a geographic region larger than the geographic area; and
apply the growth metric for each of the wireless communication device types to the past communication usage allocated to each of the wireless communication device types to predict future communication usage for each of the wireless communication device types at the wireless access node;
aggregate the predicted future communication usage loading for each of the wireless communication device types to predict the future loading on the wireless access node;
adjust a wireless access resource of the wireless access node based on the future loading for the wireless access node; and
one or more non-transitory storage media that stores the software.

11. The software apparatus of claim 10, wherein the geographic area comprises a sector of the wireless access node and the geographic region comprises an area associated with a zip code.

12. The software apparatus of claim 10, wherein the geographic area comprises a sector of the wireless access node and the geographic region comprises a metro area.

13. The software apparatus of claim 10, wherein the geographic area comprises a sector of the wireless access node and the geographic region comprises a state.

14. The software apparatus of claim 10, wherein the geographic area comprises a sector of the wireless access node and the geographic region comprises a country.

15. The software apparatus of claim 10, wherein the geographic area comprises a sector of the wireless access node and the geographic region is global.

16. The software apparatus of claim 10, comprising:
the software further configured to direct the processing system to:
identify communication session characteristics comprising the communication session types, communication session durations, and the plurality of different wireless communication device types for a plurality of communication sessions handled by the wireless access node; and
process at least the communication session characteristics to determine the usage model for the wireless access node
process the usage model to allocate the past wireless communication usage in the geographic area served by the wireless access node among the plurality of different wireless communication device types.

17. The software apparatus of claim 10, wherein the growth metric comprises user device sales information indicating a change in sales quantity of at least one of the plurality of different wireless communication device types.

18. The software apparatus of claim 10, wherein the plurality of different wireless communication device types comprise at least one of wireless communication device models and wireless communication device manufacturers.

* * * * *